(12) United States Patent
Namiwaka et al.

(10) Patent No.: US 7,641,401 B2
(45) Date of Patent: Jan. 5, 2010

(54) OPTICAL ELEMENT HOLDER AND OPTICAL COMMUNICATION MODULE

(75) Inventors: Masahiko Namiwaka, Tokyo (JP); Mitsunori Kanemoto, Tokyo (JP)

(73) Assignee: NEC Corporation, Tokyo (JP)

( * ) Notice: Subject to any disclaimer, the term of this patent is extended or adjusted under 35 U.S.C. 154(b) by 919 days.

(21) Appl. No.: 10/877,685

(22) Filed: Jun. 25, 2004

(65) Prior Publication Data
US 2004/0264891 A1    Dec. 30, 2004

(30) Foreign Application Priority Data
Jun. 27, 2003    (JP)    ............... 2003-184559

(51) Int. Cl.
*G02B 6/36* (2006.01)

(52) U.S. Cl. .............. 385/93; 385/90; 385/91; 385/92; 385/88; 385/52

(58) Field of Classification Search ............. 385/51–52, 385/88, 90–93, 136–137
See application file for complete search history.

(56) References Cited

U.S. PATENT DOCUMENTS

| | | | |
|---|---|---|---|
| 6,186,674 B1 | 2/2001 | Basavanhally | |
| 6,697,414 B1 * | 2/2004 | Kato et al. | 372/102 |
| 2002/0126965 A1 * | 9/2002 | Miyokawa | 385/92 |
| 2003/0007258 A1 * | 1/2003 | Freyhold et al. | 359/819 |

FOREIGN PATENT DOCUMENTS

| | | |
|---|---|---|
| JP | 62-187807 | 8/1987 |
| JP | 63-161419 | 7/1988 |
| JP | 63-219186 | 9/1988 |
| JP | 02-284106 | 11/1990 |
| JP | 04-223415 | 8/1992 |
| JP | 05-027146 | 2/1993 |
| JP | 5-291694 | 11/1993 |
| JP | 06-082659 | 3/1994 |
| JP | 7-140361 | 6/1995 |
| JP | 8-005876 | 1/1996 |
| JP | 10-268165 | 10/1998 |
| JP | 2000-299530 | 10/2000 |
| JP | 2002-055262 | 2/2002 |
| WO | WO 02/082148 | 10/2002 |
| WO | WO 03/005106 | 1/2003 |

OTHER PUBLICATIONS

Partial European Search Report dated Nov. 8, 2004.
European Search Report dated Dec. 14, 2004.
Japanese Office Action, dated Nov. 21, 2007 for corresponding Japanese Patent Application 2003-184559. Partial translation attached.

* cited by examiner

*Primary Examiner*—Frank G Font
*Assistant Examiner*—Eric Wong
(74) *Attorney, Agent, or Firm*—Katten Muchin Rosenman LLP (57) ABSTRACT

Disclosed are an optical element holder and an optical communication module. The optical element holder comprises a pedestal having a pair of fixing sections, a pair of holding sections and a stress-suppressing section. The fixing sections are formed in opposing end portions of the pedestal for being welded to a carrier. The holding sections are formed to face the pedestal in an inner position than positions where the fixing sections are formed so as to hold the optical element by pinching it therebetween. The stress-suppressing section prevents a welding stress, which is generated when the fixing sections are welded to the carrier, from affecting the holding sections.

13 Claims, 9 Drawing Sheets

OPTICAL ELEMENT HOLDER AND OPTICAL COMMUNICATION MODULE

BACKGROUND OF THE INVENTION

1. Field of the Invention

The present invention relates to an optical element holder and an optical communication module to which an optical element is mounted using the optical element holder.

2. Description of the Related Art

Recently, high-speed and large-capacity optical communication systems have further been advanced. Therefore, optical communication modules such as semiconductor laser modules and light-receiving modules used for the optical communication systems are required to have a higher reliability. In order to achieve the high reliability, generally and widely used is a method in which the optical elements constituting the optical communication module, such as an optical lens and an optical fiber, are fixed by a laser welding (YAG welding).

Figure 1:
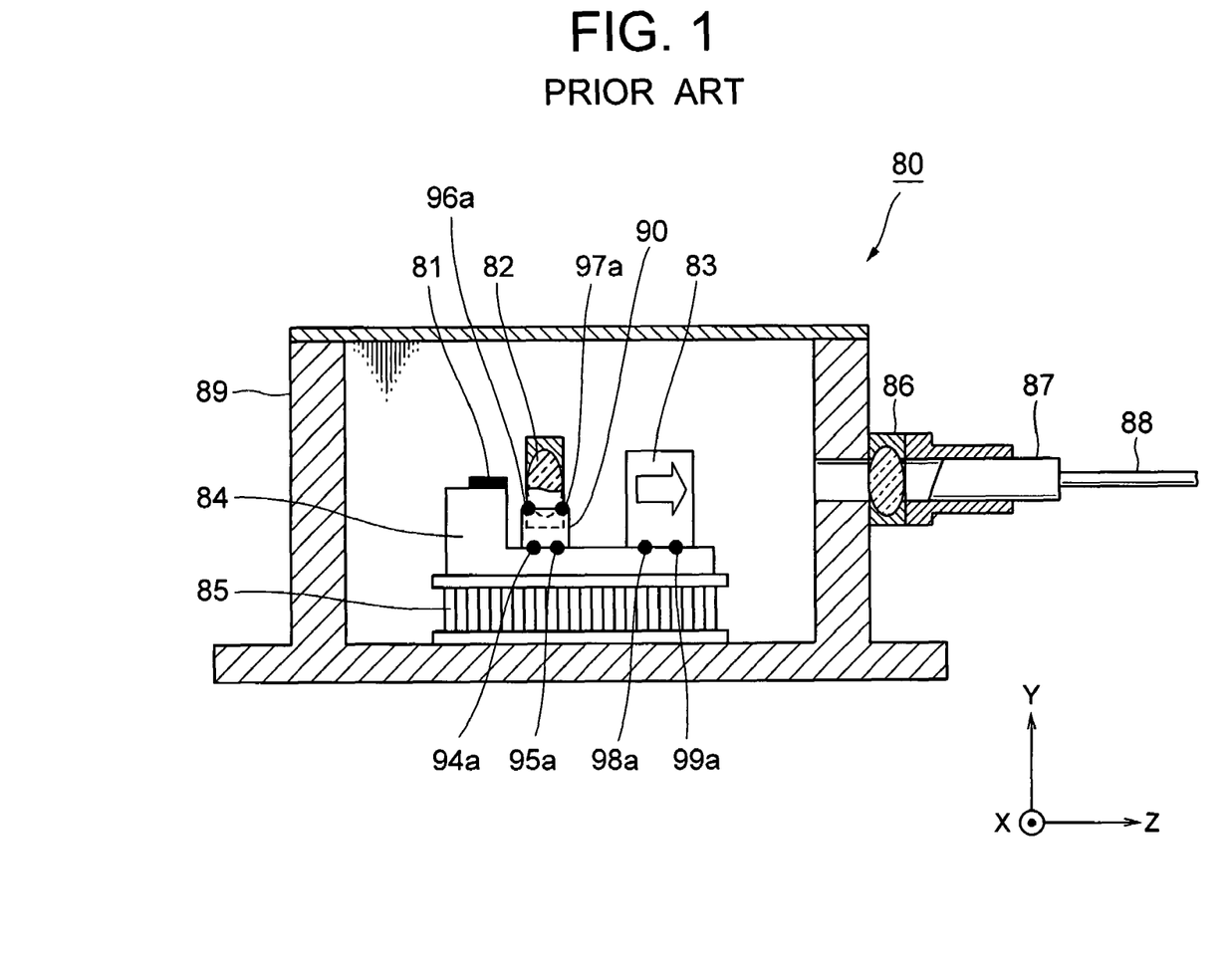
FIG. 1 is a block diagram showing a conventional optical communication module.

As shown in FIG. 1, an optical communication module 80 disclosed in Japanese Unexamined Patent Publication No. 63-219186, comprises a laser element 81, a lens 82, a U-shape holder 90, an optical isolator 83, an element carrier 84, a Peltier element 85, a lens 86, a ferrule 87, an optical fiber 88, a package 89 and the like.

Inside the package 89, the element carrier 84 is mounted through the Peltier element 85. On the element carrier 84, the laser element 81, the lens 82 and the optical isolator 83 are mounted and laser light outputted from the laser element 81 is coupled to the optical fiber 88. The optical fiber 88 is held by the ferrule 87 and the lens 86 is attached on the input side of the optical fiber 88.

Signal light is outputted from the laser element 81 and the signal light is guided to the optical isolator 83 through the lens 82. The signal light permeated through the optical isolator 83 enters into the optical fiber 88 through the lens 86. In this case, the return light from the optical fiber 88 is hindered by the optical isolator 83.

In order to compose the optical module, first, weld parts 94a, 95a of the U-shape holder 90 are laser-welded to the element carrier 84. Then, weld parts 96a, 97a, which are provided in a frame of the lens 82, are laser-welded to the U-shape holder 90. At last, weld parts 98a, 99a of the optical isolator 83 are laser-welded to the element carrier 84.

Figure 2:
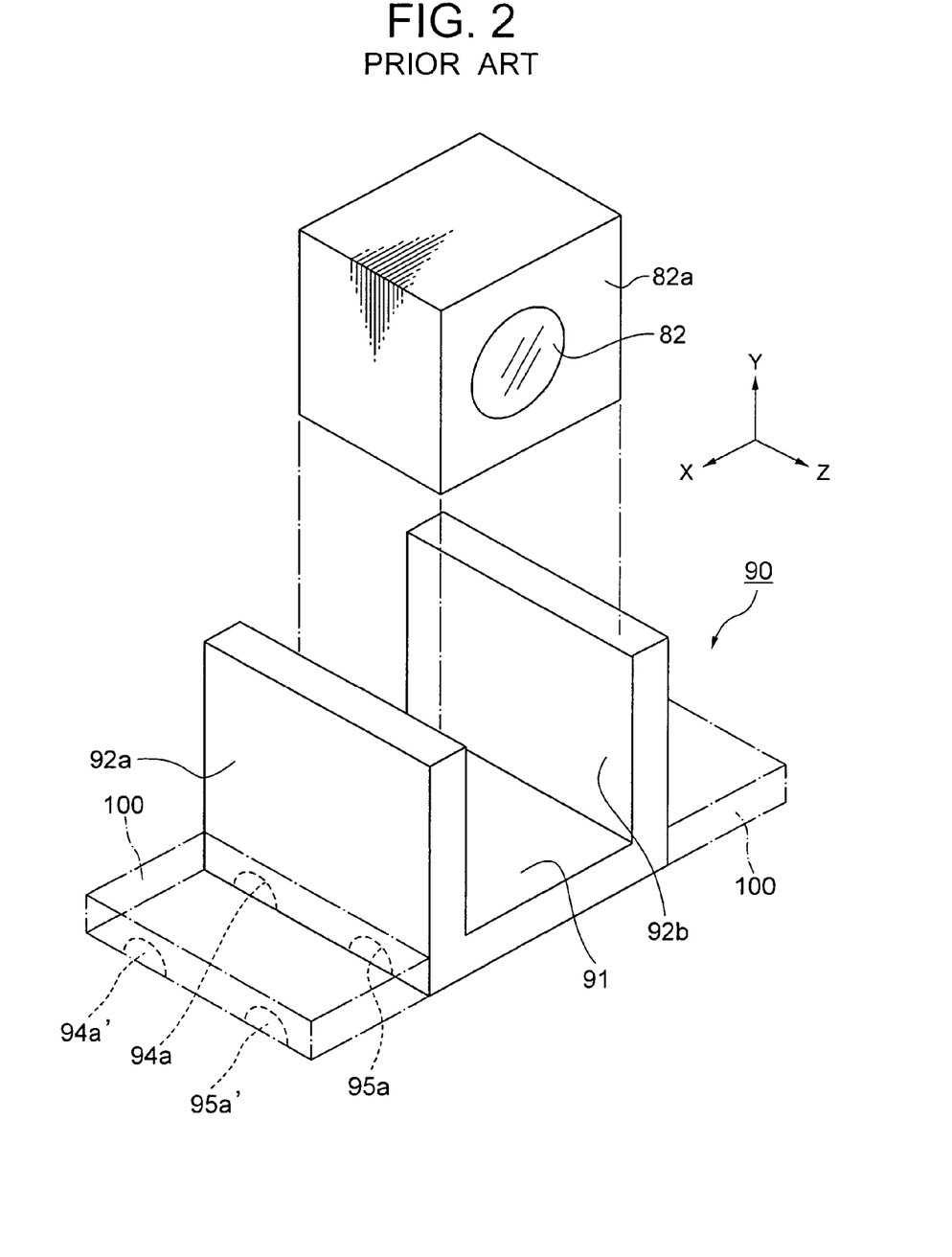
FIG. 2 is a perspective view showing a conventional optical element holder.

Next, a specific example of the conventional U-shape holder 90 will be described. Japanese Unexamined Patent Publication No. 08-5876 and the like disclose examples of the U-shape holder 90.

As shown in FIG. 2, in the conventional U-shape holder 90, a pair of opposing holding sections 92a, 92b are provided being projected on the surface side of a plate-type pedestal 91 so as to hold the lens 82 by the inner side of the two opposing holding sections 92a, 92b. At the same time, the weld parts 94a, 95a provided on the outer side of the holding sections 92a, 92b are laser-welded to the element carrier (element carrier 84 in FIG. 3A).

Figure 3A:
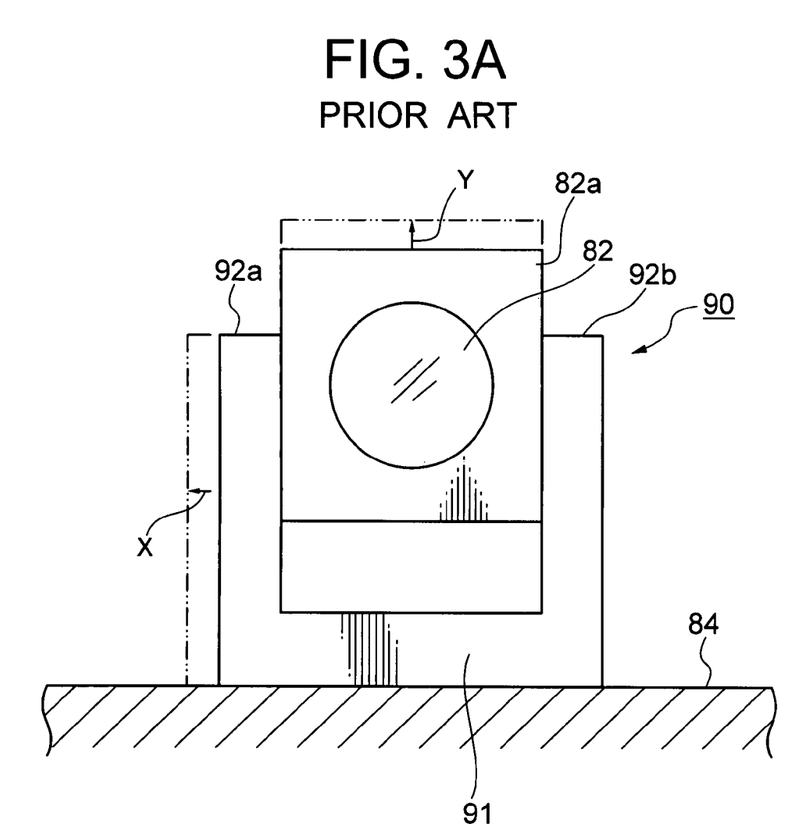
FIG. 3A is a front elevational view of the optical element holder shown in FIG. 2

In this case, the U-shape holder 90 is mounted on the element carrier 84 while the lens 82 is being inserted between the opposing holding sections 92a, 92b of the holder 90 (FIG. 2). Then, in the state where the lens 82 is disposed in front of the laser element 81, the position of the holder 90 is adjusted in the X-axis direction as shown in FIG. 3A while making the laser element 81 emit the light so as to adjust the position of the lens 82 in the optimum position in the X direction. In this state, the weld parts 94a, 95a of the holder 90 are laser-welded to the element carrier 84 so as to fix the position of the lens 82 in the X direction.

Figure 3B:
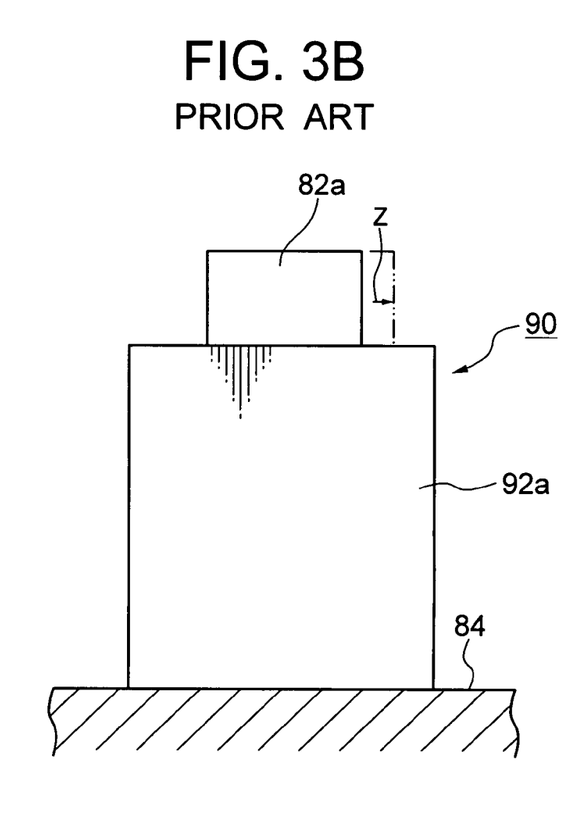
FIG. 3B is a side view of the optical element holder.

Subsequently, as shown in FIG. 3A, the lens 82 is moved in the vertical direction (Y direction) between the opposing holding sections 92a, 92b so as to adjust the lens 82 to be in the optimum position in the Y direction. Further, as shown in FIG. 3B, the lens 82 is moved in the back-to-front direction (Z direction) along the optical axis direction of the lens 82 between the opposing holding sections 92a, 92b so as to adjust the lens 82 to be in the optimum position in the Z direction.

At the point where these adjustments of the positions are completed, the frame (not shown) supporting the lens 82 is laser-welded to the holder 90.

However, there are following shortcomings in the conventional U-shape holder 90. The shortcomings are emphasized in FIG. 4 and they are to be described by referring thereto.

Figure 4:
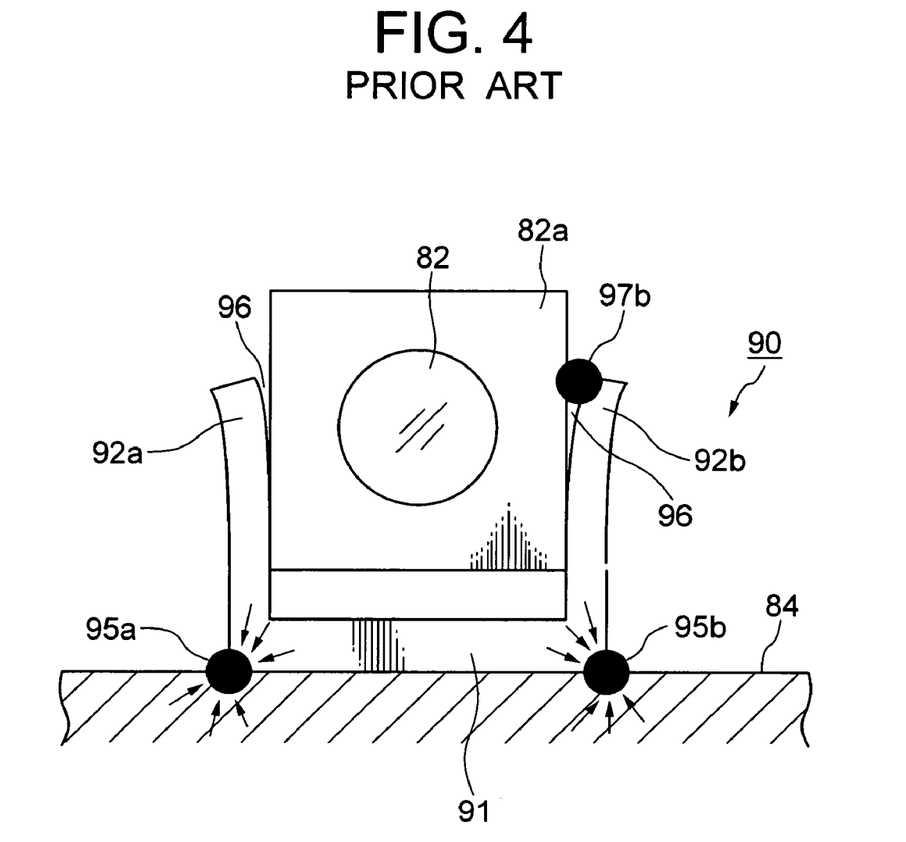
FIG. 4 is a front elevational view showing shortcomings of the conventional optical element holder.

As shown in FIG. 2 and FIG. 4, the bottom ends of the holding sections 92a, 92b of the holder 90 are welded to the element carrier 84, thereby forming the weld parts 94a, 95a between the bottom ends of the holding sections 92a, 92b and the element carrier 84. In these weld parts 94a, 95a, a welding stress as shown by an arrow is generated when being shrunk after the welding. The welding stress is generated when the inner structures of the holder 90 and the element carrier 84 are pulled towards the weld parts 94a, 95a sides. In this case, the mass of the element carrier 84 is sufficiently large as compared to that of the holder 90 so that it is hard to be affected by the welding stress. On the other hand, the holder 90 is formed in a forked shape. Therefore, when there is the welding stress generated in the bottom ends of the holding sections 92a, 92b, as shown in FIG. 4, the opposing holding sections 92a, 92b are deformed curving towards the outer side being away from each other due to the welding stress.

When adjusting the lens 82 to be in the optimum position in the Y direction and Z direction as shown in FIG. 3A and FIG. 3B, the two holding sections 92a, 92b as the reference are deformed by the welding stress as shown in FIG. 4. Thus, it is impossible to adjust the lens 82 to be in the optimum position in the Y direction and Z direction.

Further, when the holding sections 92a, 92b are deformed by receiving the welding stress, the top ends of the two holding sections 92a, 92b are deformed in the expanding direction as shown in FIG. 4 since they are formed in a forked shape.

When a frame 82a for supporting the lens 82 is welded to the two holding sections 92a, 92b, a clearance 96 is formed between the frame 82a and the holding sections 92a, 92b. Due to the clearance 96, when welding the frame 82a for supporting the lens 82 to the holding sections 92a, 92b, weld part 97b for welding therewith is formed inside the clearances 96. Thus, the frame 82a cannot be successfully welded to the holding sections 92a, 92b, which causes a trouble when determining the position of the lens 82.

In Japanese Unexamined Patent Publication No. 08-5876, the two holding sections 92a, 92b are curved to be in a convex shape towards the inner side, respectively. The frame of the lens is pinched between the two curved holding sections 92a, 92b to be welded. Further, in Japanese Unexamined Patent Publication No. 08-5876, as shown by an alternate long and short dash line in FIG. 2, projection parts 100 are projected in the lateral direction being away from the holding sections 92a, 92b.

In Japanese Unexamined Patent Publication No. 08-5876, the reason for projecting the projection parts 100, 100 in the lateral direction may be as follows. That is, weld parts 94a', 95a' for welding the projection parts 100 to the element carrier 84 are brought away from the holding sections 92a, 92b as much as possible by separating the projection parts 100, 100 away from the holding sections 92a, 92b so as to minimize the welding stress affected on the holding sections 92a, 92b, which is generated when welding the projection parts 100 to the element carrier 84. It is true that the affect of the welding stress is minimized through the configuration in which the above-described projection parts 100 are provided. However, in order to minimize the affect of the welding stress as much as possible, the forming positions of the projection parts 100 with respect to the holding sections 92a, 92b are required to be separated away as much as possible. With the configuration, the external dimension of the U-shape holder 90, especially the dimension in the lateral direction, is expanded so that the area occupied for disposing the holder 90 becomes large. Thus, it becomes impossible to meet the demand for reducing the dimension of the optical communication module using the holder 90.

SUMMARY OF THE INVENTION

An object of the present invention is to provide an optical element holder in which deformation due to the welding stress can be suppressed without expanding the dimension of the holder for holding a lens and the like, and an optical communication module to which an optical element is mounted using the optical element holder.

In order to achieve the foregoing object, the optical element holder according to the present invention comprises a pedestal having a pair of fixing sections, a pair of holding sections and a stress-suppressing section. The fixing sections are formed in opposing end portions of the pedestal for being welded to a carrier. The pair of holding sections are formed to face the pedestal in an inner position than positions where the fixing sections are formed so as to hold an optical element by pinching it therebetween. The stress-suppressing section is for preventing a welding stress, which is generated when the fixing sections are welded to the carrier, from affecting the holding sections.

In the present invention, the fixing sections are formed on the pedestal on the outer side and the holding sections are formed on the inner side of the fixing sections, respectively. Further, the stress-suppressing sections are disposed between the fixing sections on the outer side and the holding sections on the inner side.

Therefore, due to the stress-suppressing sections, the welding stress, which is generated when welding the fixing sections to the carrier, can be prevented from affecting the holding sections. Accordingly, deformation of the holding sections due to the welding stress can be suppressed as much as possible. Further, the stress-suppressing sections are disposed between the fixing sections on the outer side and the holding sections on the inner side so that the length of the fixing sections being projected from the pedestal can be shortened. Thus, the dimension of the optical element holder in the lateral direction can be minimized as much as possible. As a result, the occupied area necessary to dispose the optical element holder of the present invention can be reduced so that it becomes possible to reduce the dimension of the optical communication module to which the optical element holder is mounted.

Further, as for the stress-suppressing section, it may be in either one of the configurations in which the stress-suppressing sections are formed between the fixing sections and the holding sections or the stressing-suppressing section is formed by being bridged over the pair of holding sections.

Further, in the present invention, the stress-suppressing section may be formed by notches being cut from the surface side to the inside formed along the width direction of the holding sections.

As described, with the present invention, it is possible to avoid the affect of the welding stress through utilizing a simple configuration with notches so that the manufacturing cost can be reduced.

In this case, the notch as the stress-suppressing section is formed on the surface side of the pedestal where the holding section is formed. Also, it may be formed on an opposite-side surface of the pedestal where the holding section is formed.

One or a plurality of the notches as the stress-suppressing sections may be formed. Also, the plurality of notches may be closely formed.

As described, the surface of the pedestal for providing the notch is selected and the number of the notches is determined as appropriate. Thus, it is possible to suppress the deformation of the holding sections as much as possible by appropriately dealing with the welding stress.

In the above-described case, it has been described by referring to the stress-suppressing sections which are formed by the notches. However, it is not limited to this. For example, the stress-suppressing section may be formed over the pair of holding sections. The stress-suppressing section, which is formed over the pair of holding sections, may be formed by being bridged between the end portions of the holding sections.

The stress-suppressing section of this case forms a well-curb structure along with the pedestal and the pair of holding sections. Thus, it enables to increase the rigidity against the welding stress.

Further, it is possible to mount the optical element holder according to the present invention to an optical communication module. The optical communication module to which the optical element holder according to the present invention is mounted comprises: a light-emitting element for emitting a light beam; an optical fiber coupled to the light beam outputted from the light-emitting element; and a lens for guiding the light beam outputted from the light-emitting clement to the optical fiber. The lens is held by an optical element holder and the optical communication module is formed to have a configuration in which the above-described optical element holder is used as the optical element holder.

Even though an optical isolator for hindering the return light from the optical fibers is provided, it is possible to obtain a compact optical communication module. Further, it is possible to mount the optical amplifier and the optical isolator to the optical module regardless of the dimension of the optical element holder. Therefore, the properties of these equipments is utilized for improving the property of the optical communication module.

BRIEF DESCRIPTION OF THE DRAWINGS

FIGS. 7 are front elevational views showing second to fourth embodiments of the optical element holder according to the present invention, in which FIG. 7A shows the second embodiment, FIG. 7B shows the third embodiment, and FIG. 7C shows the fourth embodiment;

DETAILED DESCRIPTION OF THE PREFERRED EMBODIMENTS

In the followings, embodiments of the present invention will be described by referring to accompanying drawings.

As the basic configuration, the optical element holder according to the present invention comprises a pedestal 11 having fixing sections 17a, 17b, a pair of holding sections 12a, 12b and stress-suppressing sections (18a, 18b, 22a, 22b, 24a, 24b and 26). The fixing sections 17a, 17b are formed in the end portions of the pedestal 11 to be welded to a carrier 16. The pair of holding sections 12a, 12b are formed by facing against the pedestal 11 in the inner position than the forming position of the fixing sections 17a, 17b so as to hold an optical element 13 by pinching it therebetween. Further, the stress-suppressing sections are for preventing the welding stress, which is generated when welding the fixing sections 17a, 17b to the carrier 16, from affecting the holding sections 12a, 12b.

The present invention proposes at least two types of configurations for the stress-suppressing sections.

Figure 5:
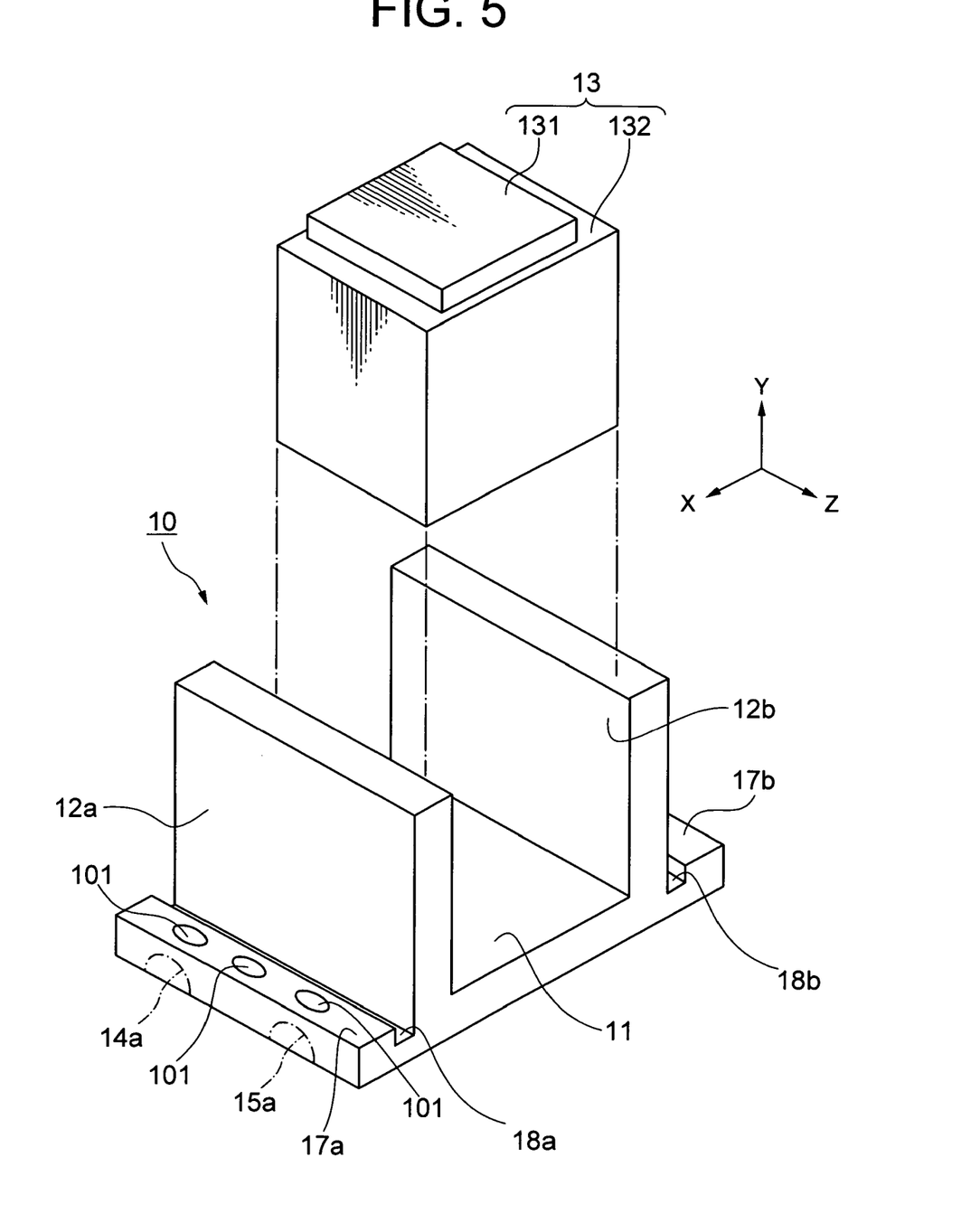
FIG. 5 is a perspective view showing a first embodiment of the optical element holder according to the present invention.

The embodiment shown in FIG. 5 shows the case using stress-suppressing sections in a notch structure.

The optical element holder 10 according to the embodiment of the present invention shown in FIG. 5 comprises the fixing sections 17a, 17b and the holding sections 12a, 12b in the pedestal 11.

The fixing sections 17a, 17b are welded to the element carrier 16 and are formed in the opposing end portions of the pedestal 11 by projecting towards the lateral direction being away from each other. The top-end portions of the fixing sections 17a, 17b are welded to the element carrier 16, thereby forming weld parts 14a, 15a between the element carrier 16 and the fixing sections 17a, 17b. FIG. 5 only shows the state where the weld parts 14a, 15a are formed between one of the fixing sections, 17a, and the element carrier 16. However, the weld parts 14a, 15a are also formed between the other fixing section 17b and the element carrier 16 as well.

Further, the holding sections 12a, 12b are formed being stood up on the pedestal 11 in the inner position than that of the fixing sections 17a, 17b. The holding sections 12a, 12b are formed in a plate-shape being stood up from the surface of the pedestal 11 in parallel by facing each other in a forked shape. The pair of holding sections 12a, 12b support the optical element 13 by the opposing inner surfaces. The optical element 13 is inserted between the pair of holding sections 12a, 12b for determining the optimum position of the optical element 13.

As the optical element 13 shown in FIG. 5, an optical amplifier 131 is used. The optical amplifier 131 is die-bonded on a frame 132 by a solder such as AuSn. As for the optical element 13, it is not limited to the optical amplifier 131 but also the optical elements such as an optical lens and an optical isolator shown in FIG. 8 and the like may be used.

As for the material for forming the frame 132 for supporting the optical amplifier 131, the fixing sections 17a, 17b and the holding sections 12a, 12b of the pedestal 11 shown in FIG. 5 and the element carrier 16, used is a material such as Fe—Ni—Co alloy, which is suitable for laser welding. Further, these are welded by, for example, using YAG laser, however, it is not limited to the laser welding using YAG laser.

The optical positioning of the optical element 13 using the optical element holder 10 shown in FIG. 5 will be specifically described. The position of the optical element 13 on the element carrier 16 in the X direction is adjusted by moving the optical element holder 10 on the element carrier 16 while pinching the optical element 13 in between the holding sections 12a, 12b of the optical element holder 10 as shown in FIG. 6A.

Figure 6A:
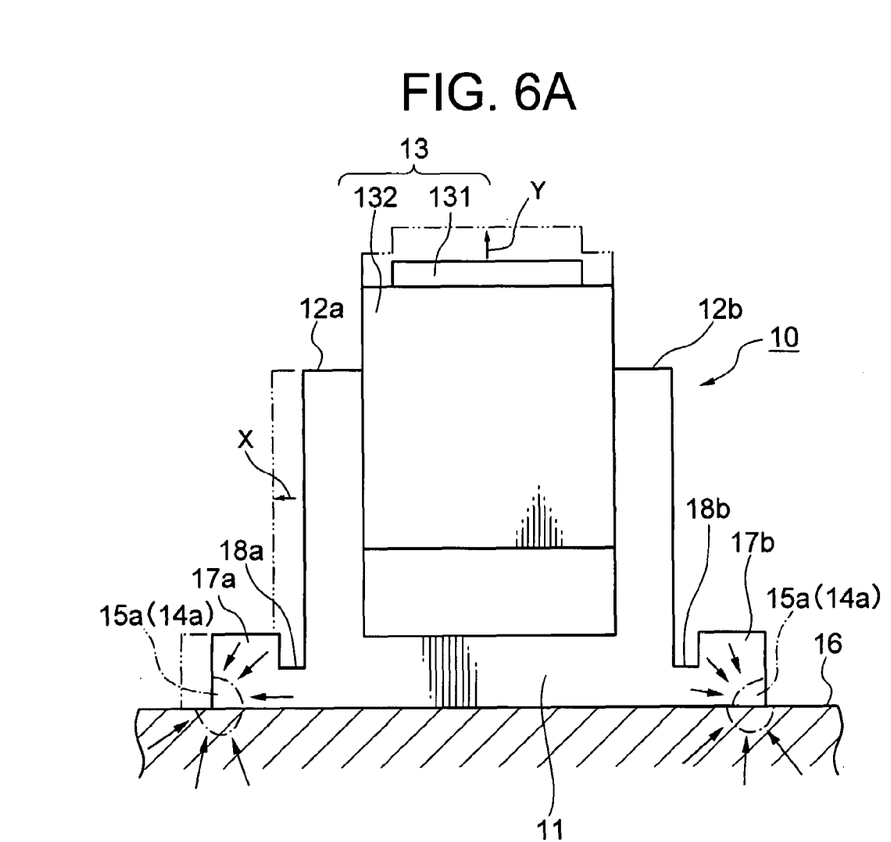
FIG. 6A is a front elevational view of the optical element holder shown in FIG. 5

The position of the optical element 13 on the element carrier 16 in the Y direction is adjusted by guiding and moving the optical element 13 in the vertical direction in the inner surfaces of the opposing two holding sections 12a, 12b as shown in FIG. 6A.

Figure 6B:
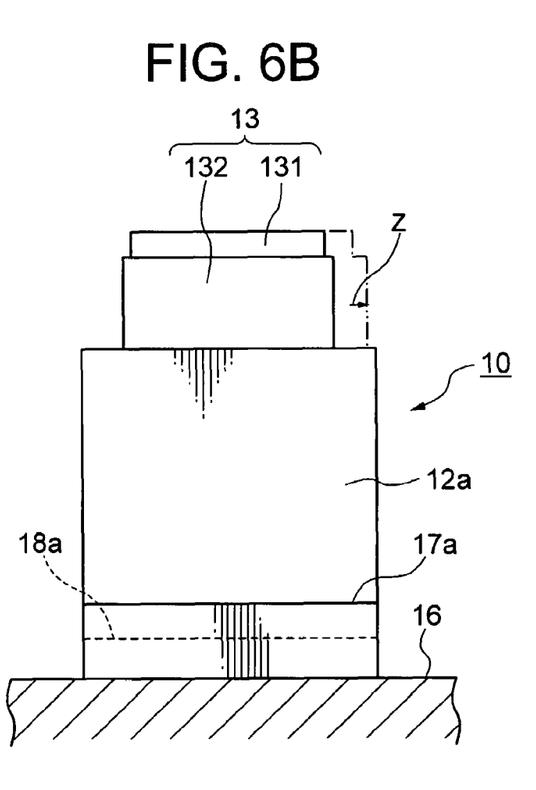
FIG. 6B is a side view of the optical element holder.

The position of the optical element 13 on the element carrier 16 in the Z direction is adjusted by guiding and moving the optical element 13 in the lateral direction (in the optical-axis direction) in the inner surfaces of the opposing two holding sections 12a, 12b as shown in FIG. 6B.

In the embodiment shown in FIG. 5, notches 18a, 18b are used as the stress-suppressing sections. The notches 18a, 18b are disposed between the fixing sections 17a, 17b and the holding sections 12a, 12b. The notches 18a, 18b are formed on the surfaces of the fixing sections 17a, 17b on the side where the holding sections 12a, 12b are provided. As shown in FIG. 5, the notches 18a, 18b are formed along the width direction of the holding sections 12a, 12b to be the notches in a concave shape which are cut towards the inner side from the surface. Further, these notches 18a, 18b are formed in a single-line form towards the width direction of the holding sections 12a, 12b.

Next, the effect of suppressing the welding stress in the optical element holder 10 according to the embodiment of the present invention as shown in FIG. 5 will be described. The optical element 13 is held by the inner sides of the holding sections 12a, 12b provided in the pedestal 11. The pedestal 11 is mounted on the element carrier 16 for determining the position, and the fixing sections 17a, 17b of the pedestal 11 are welded to the element carrier 16. Thereby, the optical element holder 10 is fixed to the element carrier 16.

When the fixing sections 17a, 17b of the optical element holder 10 are welded to the element carrier 16, the weld parts 14a, 15a as shown by broken lines in FIG. 6A are formed between the top-end portions of the fixing sections 17a, 17b and the element carrier 16 to be welded. When the weld parts 14a, 15a shrink, the welding stress shown by an arrow is generated in the inner structures of the fixing sections 17a, 17b of the optical element holder 10 and the element carrier 16.

As shown in FIG. 6A, in the present invention, there are the notches 18a, 18b provided between the fixing sections 17a, 17b and the holding sections 12a, 12b. Also, these notches 18a, 18b are formed on the surface side of the fixing sections 17a, 17b where the holding sections 12a, 12b are provided. Further, these notches 18a, 18b are formed by being cut into the inner side of the fixing sections 17a, 17b from the surface side.

When the welding stress due to welding is generated inside the fixing sections 17a, 17b, the welding stress generated inside the fixing sections 17a, 17b to affect the holding sections 12a, 12b is shuttered for the depth of the notches 18a, 18b. Therefore, the welding stress generated inside the fixing sections 17a, 17b to affect the holding sections 12a, 12b becomes small as a whole. As a result, the welding stress affecting the holding sections 12a, 12b through the fixing sections 17a, 17b becomes insufficient to deform the holding sections 12a, 12b. Thus, the holding sections 12a, 12b are not to be deformed.

Furthermore, the notches 18a, 18b for suppressing the welding stress are disposed between the holding sections 12a, 12b and the fixing sections 17a, 17b so that, as compared to the overhang amount of the fixing sections shown in FIG. 2, the overhang amount can be suppressed to minimum. Thus, the dimension of the optical element holder 10 in the lateral direction can be shortened as much as possible by suppressing the overhang amount of the fixing sections 17a, 17b to minimum. Accordingly, it enables to reduce the area occupied for disposing the optical element holder 10 in which the fixing sections 17a, 17b are provided as much as possible.

After adjusting the position of the optical element holder 10 in the X direction and mounting it to the element carrier 16 by welding as described, the position of the frame 132 of the optical element 13 in the Y direction and Z direction is adjusted so as to set the optical amplifier 131 in the optimum position. Thereby, the frame 132 is laser-welded to the optical element holder 10.

Next, another embodiment of the stress-suppressing sections according to the present invention will be described.

Figure 7A:
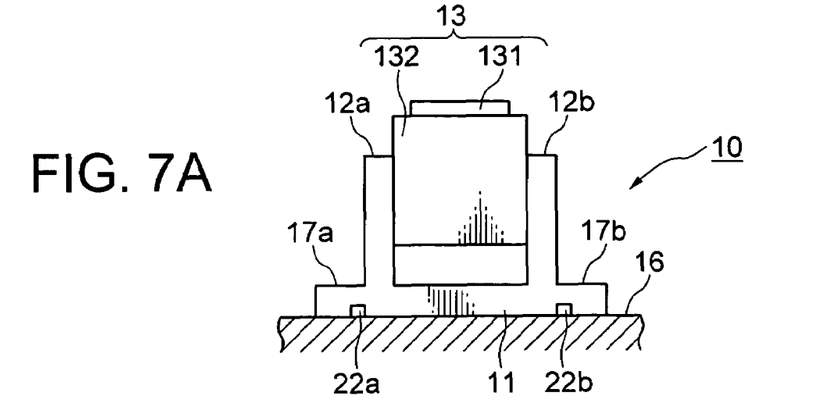

The stress-suppressing sections according to the embodiment as shown in FIG. 7A are formed by notches 22a, 22b. These notches 22a, 22b are provided on the opposite-side surfaces of the fixing sections 17a, 17b where the holding sections 12a, 12b are provided. The notches 22a, 22b are provided by utilizing the fact that the holding sections 12a, 12b are provided on the opposite-side surfaces of the fixing sections 17a, 17b where the holding sections 12a, 12b are provided. That is, the notches 22a, 22b are disposed between the fixing sections 17a, 17b and the holding sections 12a, 12b in the position extremely close to the holding sections 12a, 12b.

In FIG. 7A, the welding stress generated when the fixing sections 17a, 17b are welded to the element carrier 16 is reduced for the depth of the notches 22a, 22b. Furthermore, the notches 22a, 22b are formed closely to the holding sections 12a, 12b so that the welding stress affecting the holding sections 12a, 12b through the fixing sections 17a, 17b can be eased as much as possible.

The notches 22a, 22b as the stress-suppressing sections as shown in FIG. 7A can suppress the deformation of the holding sections 12a, 12b caused by the welding stress as in the same manner as the stress-suppressing sections shown in FIG. 5. Further, the forming position is close to the holding sections 12a, 12b so that the overhang amount of the fixing sections 17a, 17b from the pedestal 11 can be extremely shortened. Thus, the dimension of the optical element holder 10 in the lateral direction can be reduced. This provides an advantage that the occupied area for disposing the optical element holder 10 can be reduced as much as possible.

Figure 7B:
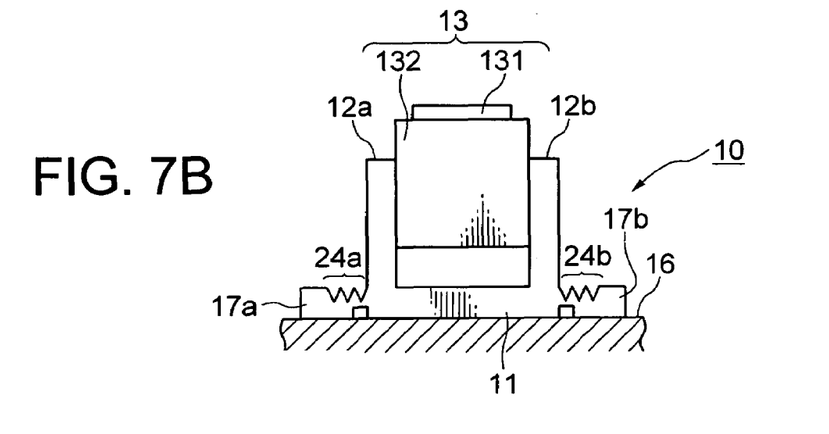

Notches 24a, 24b as the stress-suppressing sections as shown in FIG. 7B are formed in V-shape towards the inside of the fixing sections 17a, 17b from the surface side. A plurality of lines of notches are arranged along the width direction of the holding sections 12a, 12b. Each line of notches 24a, 24b is closely arranged.

The notches 24a, 24b as the stress-suppressing sections as shown in FIG. 7B are formed in V-shape towards the inside of the fixing sections 17a, 17b from the surface side so that the amount of cut into the fixing sections 17a, 17b can be suppressed to be relatively small. Therefore, it is possible to suppress the deterioration of the strength of the fixing sections 17a, 17b caused by providing the notches 24a, 24b. Further, by increasing the number of lines of the notches 24a, 24b to be provided, the extent of suppressing the welding stress is increased.

Figure 7C:
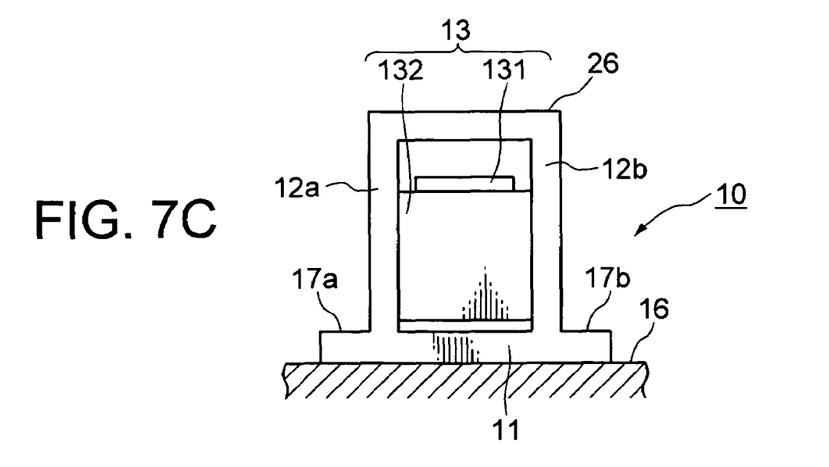

The stress-suppressing sections as shown in FIG. 7C are formed by being bridged over the pair of holding sections 12a, 12b. That is, a crossbeam-type connecting section 26 is used as the stress-suppressing section and the connecting section 26 is bridged over the end portions of the pair of holding sections 12a, 12b. Thereby, the pair of holding sections 12a, 12b are formed in a well-curb form as a whole together with the pedestal 11 and the connecting section 26, in which the pedestal 11 and the connecting section 26 are bridged between the end portions on the top and bottom.

Accordingly, the stress-suppressing section as shown in FIG. 7C has a configuration which is resistant to the welding stress affected from the fixing sections 17a, 17b to the holding sections 12a, 12b. Thus, it is possible to protect the holding sections 12a, 12b from the welding stress generated inside the fixing sections 17a, 17b in the same manner as the above-described embodiment. Further, compared to the embodiment in which the stress-suppressing sections are provided in the fixing sections, the higher strength of the fixing sections 17a, 17b can be maintained.

Next, described is a case of constituting an optical communication module in which the optical element is held by using the optical element holder 10 according to the present invention.

Figure 8:
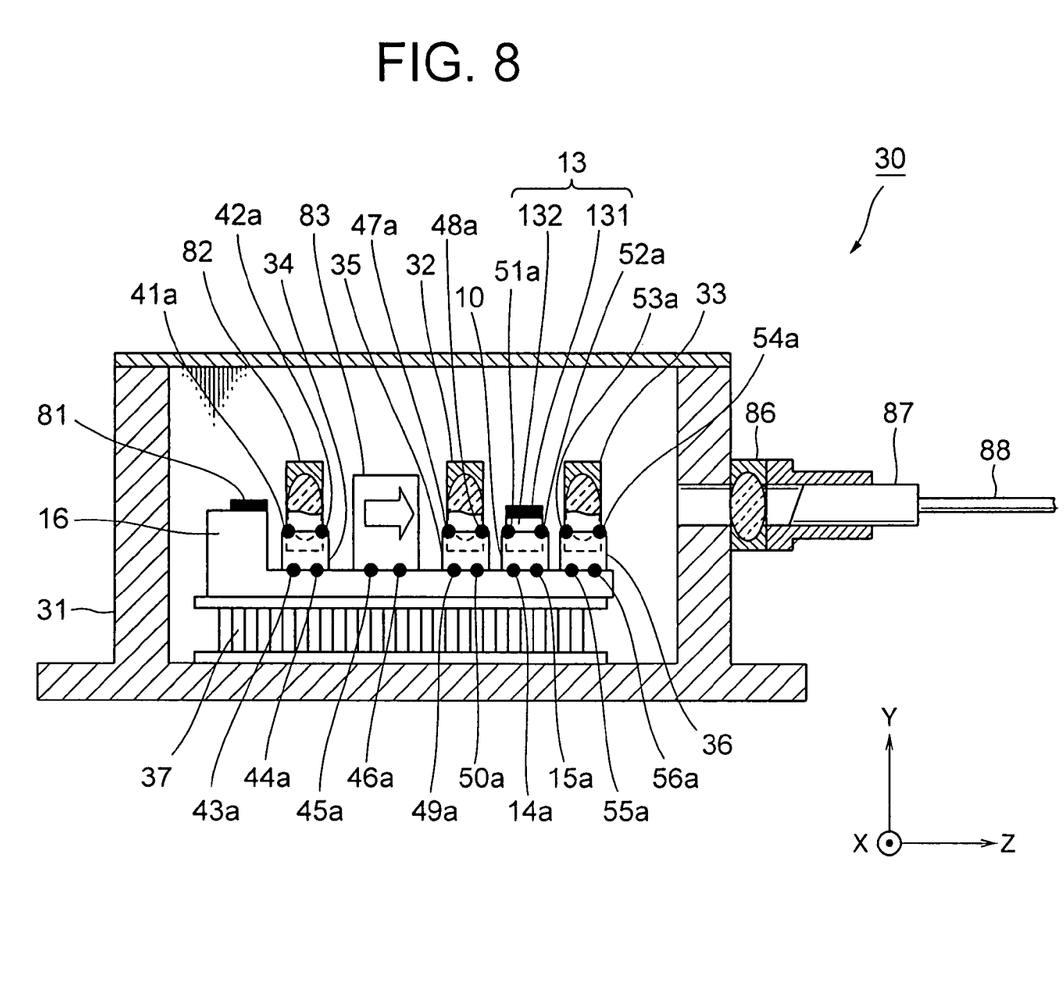
FIG. 8 is a block diagram showing the first embodiment of the optical communication module according to the present invention.

Basically, an optical communication module 30 of the embodiment comprises: a laser element 81 for outputting signal light; an optical amplifier 131 for amplifying the signal light outputted from the laser element 81; the element carrier 16 for fixing the laser element 81 and the optical amplifier 131 in which the optical axes are adjusted to each other; the optical element holder 10 for fixing the optical amplifier 131 to the element carrier 16; a package 31 for enclosing the laser element 81, the optical amplifier 131, the element carrier 16 and the optical element holder 10; and an optical fiber 88 for guiding the signal light amplified by the optical amplifier 131 to the outside of the package 31.

Further, in the optical communication module 30, lenses 82, 32, 33, 86, U-shape holders 34, 35, 36, an optical isolator 83, a Peltier element 37, a ferrule 87 and the like are provided. The lens 82 guides the signal light outputted from the laser element 81 to the optical isolator 83. The optical isolator 83 prevents the return light to the laser element 81. The lens 32 concentrates the signal light from the optical isolator 83 onto the optical amplifier 131. The lens 33 concentrates the signal light amplified by the optical amplifier 131 to the optical fiber 88. The Peltier element 37 keeps the laser element 81 and the optical amplifier 131 at a constant temperature.

The element carrier 16 is placed inside the package 31 by a support of the Peltier element 37. One optical element holder 10 is disposed between the laser element 81 and the optical isolator 83 and the fixing sections 17a, 17b of the optical element holder 10 are welded to the element carrier 16. The weld parts are shown as the weld parts 43a, 44a. Further, a frame for supporting the lens 82 is welded to the holding sections 12a, 12b of the optical element holder 10. The weld parts are shown as weld parts 41a, 42a.

Another optical element holder 10 is disposed between the optical isolator 83 and the optical amplifier 131 and the fixing sections 17a, 17b of the optical element holder 10 are welded to the element carrier 16. The weld parts are shown as weld parts 49a, 50a. A frame for supporting the lens 32 is welded to the holding sections 12a, 12b of the optical element holder 10. The weld parts are shown as weld parts 47a, 48a.

Still another optical element holder 10 is disposed between the optical amplifier 131 and the lens 86 and the fixing sections 17a, 17b of the optical element holder 10 are welded to the element carrier 16. The weld parts are shown as weld parts 55a, 56a. A frame for supporting the lens 33 is welded to the holding sections 12a, 12b of the optical element holder 10. The weld parts are shows as weld parts 53a, 54a.

Figure 9:
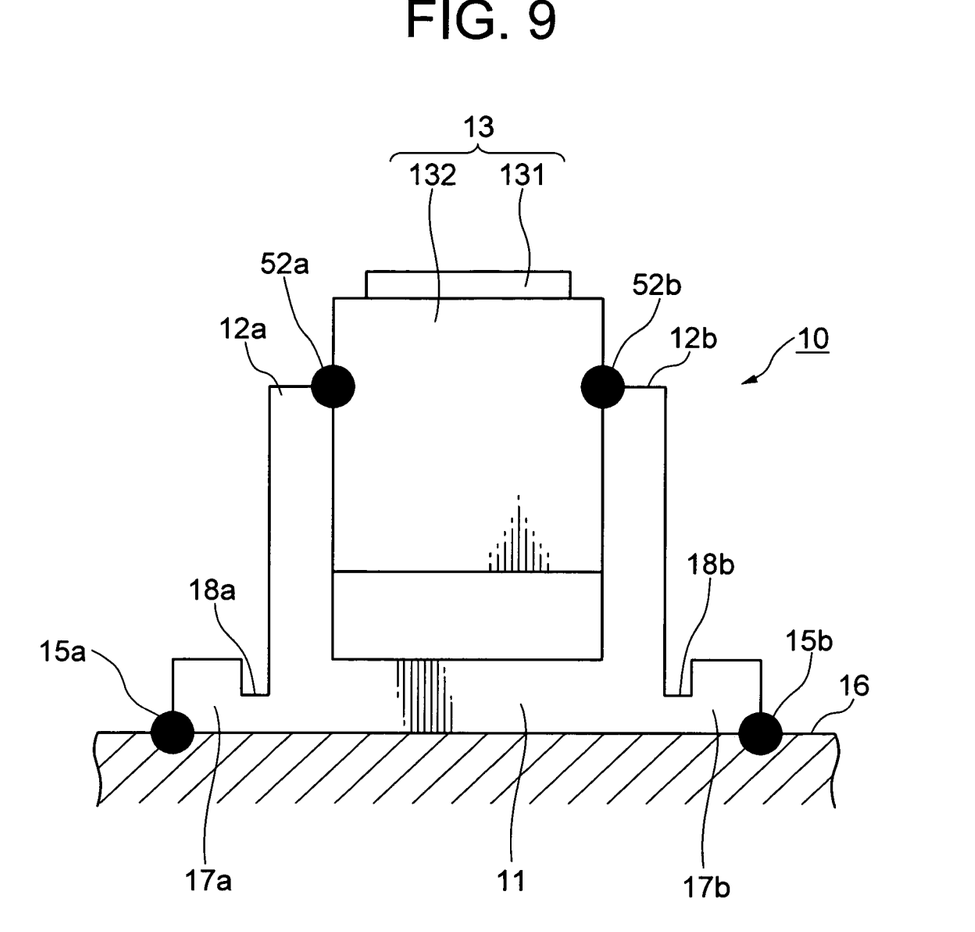
FIG. 9 is a front elevational view of the optical element holder of FIG. 5 shown in FIG. 8 as viewed from the Z-axis direction.

On the opposite side which is in the position not to be seen in FIG. 8, weld parts 14b, 15b, 41b to 56b are formed symmetrically with weld parts 14a, 15a, 41a to 56a as shown in FIG. 9. In FIG. 9, some weld parts which are in the position not to be seen are omitted.

Conventionally, it is extremely difficult to enclose the laser element 81 and the optical amplifier 131 in one package 31 since the optical positioning of the laser element 81 and the optical amplifier 131 is difficult to be performed. The reason is as follows. The laser welding is required for determining the positions with a high precision, however, the conventional U-shape holder is deformed by the stress at the time of welding even by the laser welding. Therefore, in the embodiment, the laser element 81 and the optical amplifier 131 are positioned with high precision using the optical element holder 10 which is not easily deformed at the time of welding. Thereby, the optical communication module 30 in which the laser element 81 and the optical amplifier 131 are enclosed in one package 31 is achieved.

Next, the manner of composing the optical communication module 30 will be described.

In order to make the diffused light emitted from the laser element 81 be collimated light, the lens 82 is adjusted in the X-axis direction, Y-axis direction and Z-axis direction while driving the laser element 81, and the lens 82 is fixed to the element carrier 16 by YAG laser welding. The optical isolator 83 is disposed in almost the center of the collimated light so that the collimated light from the lens 82 passes through the optical isolator 83, and the optical isolator 83 is fixed to the element carrier 16 by YAG laser welding. The lens 32 has a function of focusing the incoming light by the collimated light at a specific distance. It is adjusted almost in the center of the collimated light and fixed to the element carrier 16 by YAG laser welding.

The optical amplifier 131 is adjusted to the position where the light from the lens 32 focuses on. That is, the frame 132 to which the optical amplifier 131 is mounted is adjusted in the X-axis direction, Y-axis direction and Z-axis direction through the optical element holder 10. Then, the optical element holder 10 is fixed to the element carrier 16 by YAG laser welding.

It will be described more specifically. First, the frame 132 is inserted to the optical element holder 10 and the frame 132 is set in an instrument which is capable of adjusting it in the three axes direction of X, Y and Z. When the light of the laser element effectively enters the optical amplifier 131, the light is amplified and a larger output of light can be achieved. By utilizing the effect, the frame 132 is adjusted in the optimum position by monitoring the optical output from the optical amplifier 131 to be the maximum using an optical power meter and the like.

After the adjustment, the optical element holder 10 and the element carrier 16 are fixed by YAG laser welding. Thereby, the position of the frame 132 in regards to the X direction is fixed. At this time, the conditions such as the output power and the time of performing YAG laser welding are set beforehand to be the optimum so that cracks are not generated in the metal joint area, i.e., the weld parts 14a, 15a after the welding.

Subsequently, after adjusting the frame 132 to be in the optimum position in the movable directions of Y-axis and Z-axis, to make sure, the frame 132 and the optical element holder 10 are fixed once again by YAG laser welding.

In the same manner, the lenses 33 and 86 are adjusted and fixed. At last, the optical fiber 88 is adjusted and fixed to the optimum position by monitoring the optical output.

Needless to say, the present invention is not limited to the above-described embodiments. For example, an optical modulator may be used instead of using the optical amplifier.

Also, although the notches are used as the stress-suppressing sections, instead of the notches, a plurality of through-holes 101 may be used as the stress-suppressing sections by providing the through-holes 101 in the fixing sections 17a, 17b as shown in FIG. 5. Further, concave parts may be used instead of using the through-holes 101. Any types of the stress-suppressing sections can be used as long as they can suppress the welding stress which affects the holding sections through the fixing sections when welding the fixing sections.

As described above, with the present invention, it enables to prevent the optical element holder from being deformed by the welding stress through providing the stress-suppressing sections which shutter or ease the stress generated at the time of welding. Further, the dimension of the optical element holder can be reduced so that, by using it, the optical communication module can be made compact.

What is claimed is:

1. An optical element holder, comprising:
a pedestal having a pair of fixing sections;
a pair of holding sections; and
a stress-suppressing section, wherein:
the fixing sections are formed in opposing end portions of the pedestal for being welded to a carrier;
the holding sections are formed facing against the pedestal in an inner position than positions where the fixing sections are formed so as to hold the optical element by pinching it therebetween; and
the stress-suppressing section is for preventing a welding stress, which is generated when the fixing sections are welded to the carrier, from affecting the holding sections.

2. The optical element holder according to claim 1, wherein the stress-suppressing section is formed between the fixing sections and the holding sections.

3. The optical element holder according to claim 1, wherein the stress-suppressing section is formed by being bridged over the pair of holding sections.

4. The optical element holder according to claim 2, wherein the stress-suppressing section is formed by a notch being cut into a surface of the holder, the notch being formed along a width direction of the holding section.

5. The optical element holder according to claim 4, wherein the notch is formed on a surface of the fixing section side where the holding section is formed.

6. The optical element holder according to claim 4, wherein the notch is formed on a bottom surface of the fixing section.

7. The optical element holder according to claim 4, wherein at least one of the notch and at least one further notch is formed in one or a plurality of lines.

8. The optical element holder according to claim 7, wherein the plurality of notches are closely formed.

9. The optical element holder according to claim 3, wherein the stress-suppressing section which is formed by being bridged over the pair of holding sections is bridged over the end portions of the holding sections.

10. An optical element holder comprising:

a pedestal;

a holding section, located on the pedestal, for holding an optical element, the holding section including a pair of holding elements formed so as to hold the optical element by pinching it therebetween;

a fixing section, located around the pedestal, for being welded and fixed to a carrier; and a stress-preventing section, located between the fixing section and the holding section, for preventing transmitting a welding stress to the holding section from the fixing section.

11. An optical communication module, comprising:

a light-emitting element for emitting a light beam;

an optical fiber coupled to the light beam outputted from the light-emitting element; and a lens for guiding the light beam outputted from the light-emitting element to the optical fiber, wherein the lens is held by an optical element holder;

wherein the optical element holder includes a pedestal having a pair of fixing sections, a pair of holding sections, and a stress-suppressing section, and wherein the holding sections are formed facing against the pedestal in an inner position than positions where the fixing sections are formed so as to hold the optical element by pinching it therebetween.

12. The optical communication module according to claim 11, further comprising an optical amplifier for amplifying the light beam guided to the optical fiber.

13. The optical communication module according to claim 11, further comprising an optical isolator for hindering return light from the optical fiber.

* * * * *